Aug. 12, 1952 A. D. SABORSKY 2,606,644
DRYING APPARATUS
Filed Feb. 25, 1950 2 SHEETS—SHEET 1
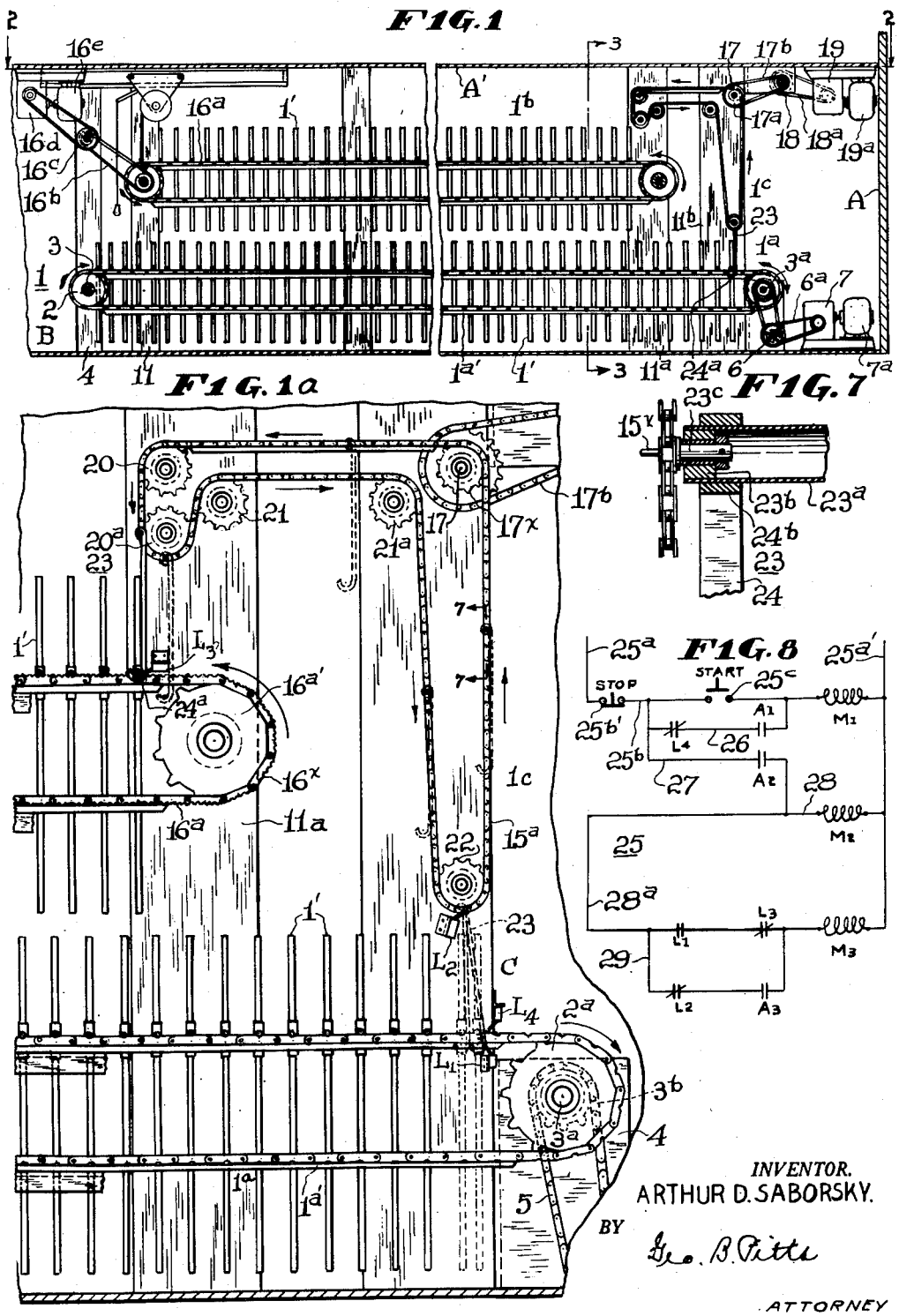
INVENTOR.
ARTHUR D. SABORSKY.
BY
Geo. B. Pitts
ATTORNEY

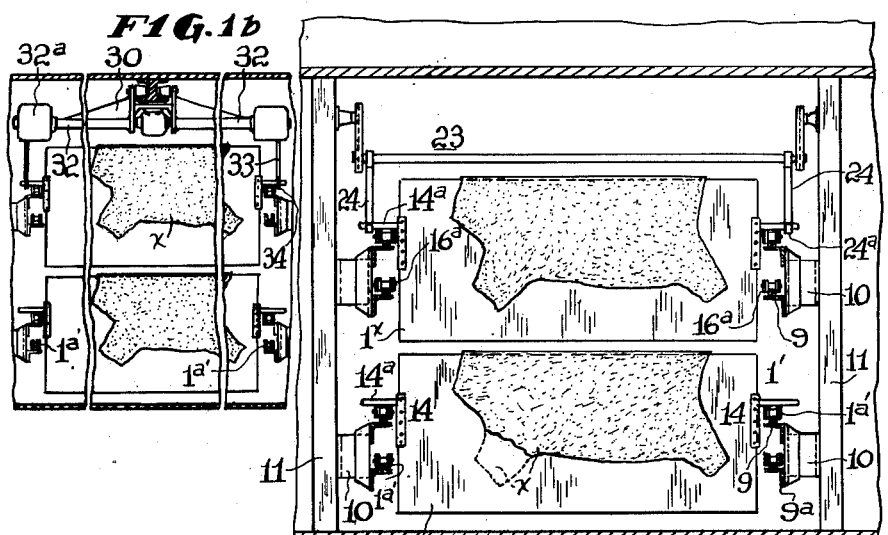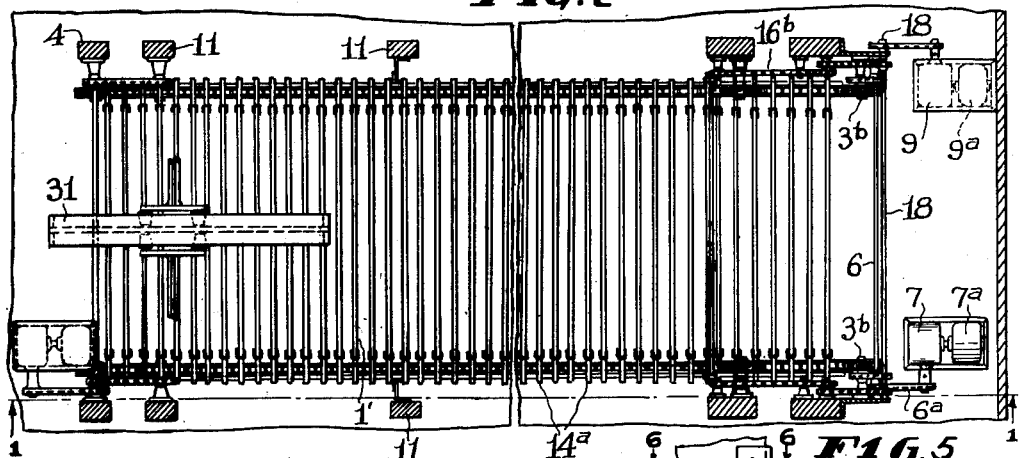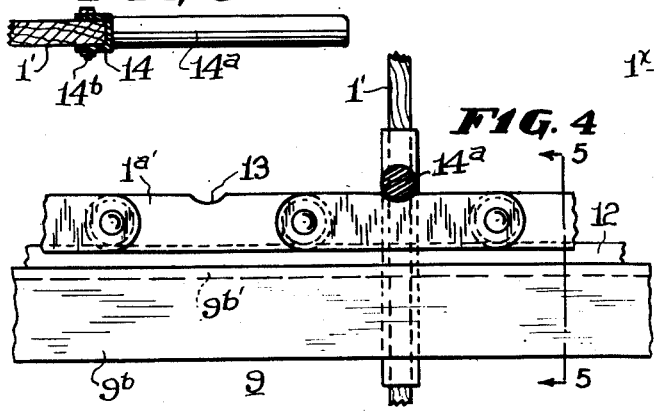

Patented Aug. 12, 1952

2,606,644

UNITED STATES PATENT OFFICE 2,606,644

DRYING APPARATUS

Arthur D. Saborsky, Bay Village, Ohio

Application February 25, 1950, Serial No. 146,339

8 Claims. (Cl. 198—21)

This invention relates to apparatus for drying sections of sheet material. I have applied the invention to the drying of material the sections of which must be separately supported, for example, treated animal hides.

The invention includes a plurality of drying conveyors for moving the material supporting members from end to end thereof, the conveyors being disposed in parallel relation and oppositely driven, whereby loading of one conveyor and unloading of the other is provided for at one location and continuity of operation may be carried on for an indefinite period.

The speed of the conveyors is dependent upon the capacity thereof and the natural or artificial atmospheric conditions to effect a complete drying of the hides within a predetermined time period. The apparatus may be positioned in a building or an air conditioned enclosure. But where provision is made to supply a heated atmosphere or a partially dehydrated atmosphere, the speed of the conveyors may be increased. It will be understood that the invention herein is not limited to any speed or speed limits, but may be regulated to meet varying conditons as well as the kind, thickness and nature of the material to be dried.

The invention includes a plurality of drying conveyors for the members on which the hides are supported and carried through a cycle to effect drying of the hides, the conveyors being so related that the hide supporting members may be readily recarried through the cycle when desirable.

The hides are initially positioned on separate supporting members and the latter are then successively positioned on the upper run of the one drying conveyor for travel therewith to a transfer mechanism and then automatically transferred to the upper run of a second drying conveyor for travel to an unloading location. During travel of the supporting members on these conveyors the hides being exposed to the air and become dry ready for further processing. The operations of positioning of the hides on the supporting members and the supplying and positioning of the latter on the main conveyor are preferably carried out manually.

One object of the invention is to provide an improved conveyor system for removably carrying the supporting members, on which the sections of material to be dried are applied, the supporting members being supplied to one end of one drying conveyor by an operator and moved thereby to a transfer station and then automatically transferred to a second drying conveyor for movement therewith and returned to the location adjacent the loading end, whereby during travel of the supporting members on the conveyors the sections of material are subjected to natural or artificial atmospheric conditions and dried.

Another object of the invention is to provide an improved conveyor system wherein the material supporting members are removably carried by the conveyors, whereby the successive supply of the members to one drying conveyor, automatic transfer of the members to a second drying conveyor and removal from the latter, are facilitated.

Another object of the invention is to provide an improved drying apparatus for sections of material mounted on separate supports, comprising a loading drying conveyor, on which the supports are successively mounted, a transfer mechanism between the discharge end of the loading conveyor and the receiving end of an unloading conveyor, the transfer mechanism being automatically controlled in coordinated relation to the successively moving supports on the loading conveyor.

Another object of the invention is to provide an improved apparatus for drying sections of materials mounted on separate supports consisting of a driven loading drying conveyor to which the supports for the sections of material are successively supplied for movement to a transfer station, a driven unloading conveyor associated with the loading conveyor and arranged to successively receive the supports for movement to an unloading location, a normally stationary power driven mechanism for automatically transferring each support from the loading conveyor to the unloading conveyor and mechanism actuated by each support as it is advanced by the loading conveyor for controlling the starting of the power for driving said transfer mechanism.

Another object of the invention is to provide an improved conveyor system on which material supporting members are removably supported, consisting of a loading conveyor on one end of which the members are loaded and moved in one direction, an unloading conveyor above and in the vertical plane of the loading conveyor and driven in the opposite direction for moving the members to a position for unloading, and an automatically operated mechanism at the other end of the loading conveyor for transferring the members from the latter to the unloading conveyor, the unloading end of the unloading conveyor terminating inwardly of the loading end of the loading conveyor to permit the members to be repositioned on the latter conveyor.

Another object of the invention is to provide an improved conveyor system for material supporting members having parallelly related oppositely moving conveyors corresponding ends of which are related to a loading and unloading location, a transfer mechanism for the members between the other corresponding ends of the conveyors and electrical means for automatically controlling the starting and stopping of the transfer mechanism and stopping of the transfer mechanism and one or both conveyors in the event of power failure, breakdown or other cause.

Other objects of the invention will be apparent to those skilled in the art to which my invention relates from the following description taken in connection with the accompanying drawings, wherein Fig. 1 is a side elevation of an apparatus embodying my invention (parts being somewhat diagrammatic) on the line 1—1 of Fig. 2;

Fig. 1a is a fragmentary side elevation of parts shown in Fig. 1, enlarged;

Fig. 1b is a section on the line 1b—1b of Fig. 1;

Fig. 2 is a section on the line 2—2 of Fig. 1;

Fig. 3 is a section on the line 3—3 of Fig. 1;

Fig. 4 is a fragmentary section on the line 4—4 of Fig. 5;

Fig. 5 is a fragmentary section on the line 5—5 of Fig. 4;

Fig. 6 is a fragmentary section on the line 6—6 of Fig. 5;

Fig. 7 is a fragmentary section on the line 7—7 of Fig. 1a; and

Fig. 8 is a diagram of the electrical circuit.

In the drawings, 1 indicates as an entirety a conveyor system comprising parallelly related conveyors, indicated as entireties at 1a, 1b, respectively, and a transfer mechanism, indicated as an entirety at 1c, between corresponding ends of the conveyors 1a, 1b. The conveyors 1a, 1b, are preferably arranged one above the other and having at their other corresponding ends a loading and unloading location B; as the conveyors are driven in opposite directions at preferably the same speed, the loading conveyor 1a may be loaded at the location B with the material supporting members and the latter moved to the transfer position and then transferred to the unloading conveyor 1b and returned by the latter to the location B. The loading conveyor 1a comprises two spaced parallel endless chains 1a' engaging spaced pairs of sprockets 2, 2a, mounted on axially alined shafts 3, 3, and 3a, 3a, respectively. Each of the shafts 3, 3a, outwardly of the adjacent sprocket is supported in suitable bearings, the housing for the latter being mounted on a support 4. The supports 4 are shown as consisting of uprights mounted on the floor of the building A. In the arrangement shown the spacing of the chains 1a' provide an open space between them, to accommodate the material supporting members, each indicated as an entirety at 1', which are removably positioned on the upper runs of the chains 1a' for movement therewith and depending downwardly between chains. The shafts 3a at the opposite end of the conveyor 1a are provided with sprockets 3b engaged by endless chains 5 driven from sprockets fixed to a countershaft 6. The shaft 6 is provided with a sprocket driven by a chain 6a from the driven shaft of a gear reduction mechanism 7, which in turn is driven by a motor 7a.

In the arrangement above set forth the upper runs of the endless chains 1a' are driven in a clockwise direction, as viewed in Figs. 1 and 1a, to move the supporting members 1' from the loading and unloading location B to a transfer station C, as later set forth. As particularly shown in Figs. 4 and 5, the links of each chain 1a' comprise spaced side bars the overlapping ends of which are connected by pintles or pins each supporting between the adjacent side bars a roller 8.

The driving mechanism between the motor 7a and those sprockets which engage and drive the chains 1a' may be of any desired form and arrangement, except, for a reason later set forth, each link of each chain and a link of the other chain must be maintained in alinement during movement throughout their upper run and both chains driven at the same rate of speed. The conveyor chains 1a' while traversing their upper run and lower runs engage supports 9, 9a, respectively, extending substantially from end to end of the runs. The supports 9, 9a, are mounted on hangers 10 projecting from the inner sides of uprights 11, 11a. As the supports for the runs of each chain 1a' are similar in construction only one thereof will be described, as shown in Figs. 4 and 5. In these views 9b indicates an angle one leg of which is suitably fixed to the adjacent hangers 10. The other leg of the angle extends laterally inwardly to form a horizontal base 9b' for a track 12 which is coextensive in length with the base 9b' and is engaged by the rollers 8 during movement of the adjacent chain. It will be understood that the tracks 12 and rollers 8 are formed of a suitable material which will resist wear. The chains 1a' are of standard construction, except that the upper edges of the side bars of each link intermediate its opposite ends are provided with a pair of alined elements, and, as already set forth, since each chain link of one chain is alined with a link of the other chain, it follows that the pairs of elements in alined links are in alinement. As will be later apparent, the alined pairs of elements serve as guide means when each material supporting member 1' is positioned on the conveyor and maintains each member transversely of the conveyor runs during movement therewith. Where the members 1' are loaded on successively positioned alined elements, each member 1' is equally spaced from adjacent members. The positioning elements in each chain link are shown as consisting of recesses 13 formed in the outer edges of the side bars forming each link.

Each material supporting member 1' preferably consists of a polygonally shaped device 1x the opposite faces of which are flat throughout their areas. The opposite ends of the device are provided with fittings 14 having outwardly extending arms 14a. When the supporting members 1' are supplied to or loaded on the conveyor 1a, as later set forth, the arms 14a thereof are seated in the alined recesses 13 on the alined chain links. Each of the fittings 14 is of U-shape in cross section and fits over the adjacent end of the device 1x and is secured thereto by bolts 14b. As willl be observed from the drawings, the devices 14 are positioned on each device 1x so as to support the arms 14a above the center of gravity of the device; accordingly, when the arms 14a engage the chains 1a' the adjacent device 1x will hang in a vertical position. The devices 1x are preferably formed of wood. In the apparatus as herein illustrated, the devices 1x of the members 1' employed for supporting the hides x are 11' long and 5' wide, but obviously the length and width of the devices as well as the spacing of the chains 1a' will depend on the size of the hides x to be dried. In practice a hide x may be folded over the upper edge of each device 1x so as to engage the opposite sides thereof as shown in Fig. 3, or otherwise secured thereto. In this view, portion of the hide x is broken away and a portion thereof on the remote side of the device 1x is shown in dotted lines. In practice one or more members 1' may be supported on a frame or a wheel mounted rack and while so supported the hides x may be mounted thereon. The members 1' are then moved to the location B where each member may be manually loaded on the conveyor chains 1a'. As the chains 1a' are moving at a slow rate of speed, the hide supporting members 1' may be successively loaded thereon with arms 14a in the seats 13, so that the members 1' will be uniformly spaced and the hides will be exposed to the atmosphere.

As shown, the transfer mechanism 1c is operatively associated with the lower or loading conveyor 1a adjacent that end thereof remote from location B, but inwardly of the sprockets 2a, the mechanism 1c being operable to engage each supporting member 1' and transfer it to the upper run of the upper conveyor 1b. The unloading conveyor 1b is similar in construction to the conveyor 1a, except that the upper surfaces of the links of the chains 16a, 16a, forming the unloading conveyor 1b are preferably provided with serrations 16x, the shafts for the chain carrying sprockets 16a' being supported on the uprights 11, 11a, and provided with sprockets driven by chains 16b from sprockets fixed to a transversely disposed shaft 16c. The shaft 16c is chain driven through a suitable gear reduction unit 16d by a motor 16e, the unit and motor being preferably secured to the ceiling A'. The chains 16a, 16a, forming the conveyor 1b are driven in a direction opposite to that of the chains 1a', so that their upper runs are driven counterclockwise, that is, toward the left as viewed in Figs. 1 and 1a. As shown in Fig. 1, the upper conveyor 1b terminates inwardly of the opposite ends of the lower conveyor 1a, in which arrangement (a) the transfer of each of the supporting members 1' by the mechanism 1c from the upper run of the loading conveyor 1a to the upper run of the unloading conveyor 1b and (b) unloading of each of the members 1' from the conveyor 1b and positioning thereof on a frame or rack or on the upper run of the conveyor 1a, are facilitated.

The transfer mechanism 1c consists of the following: 15a, 15a, indicate a pair of endless chains engaging with and guided by pairs of alined sprockets mounted on shafts, which extend outwardly beyond the chains 15a, 15a, and are suitably mounted in bearings on the uprights 11a and 11b. The shafts 17 for one pair of sprockets, preferably sprockets 17a, are provided with separate sprockets 17x engaged and driven by chains 17b from sprockets on the opposite end portions of a shaft 18, which in turn is provided with a sprocket driven by a chain 18a from a gear reducing mechanism 19. The mechanism 19 is intermittently driven by a motor 19a, which is automatically started to drive the chains 15a, 15a, and stopped as later set forth. The chains 15a, 15a, are guided from the sprockets 17a to the upper and lower pairs of sprockets 20, 20a, associated with the receiving end of the unloading conveyor 1b inwardly of the adjacent sprockets 16a' and then around the pairs of sprockets 21, 21a; from the latter pair of sprockets the chains 15a, 15a, reeve around a pair of sprockets 22 disposed above and adjacent the inner end of the conveyor 1a. As shown in Figs. 2 and 3, the chains 15a, 15a, traverse paths in vertical planes outwardly of the chains 1a'—1a' and chains 16a, 16a, so that a transfer or carrying member, indicated as an entirety at 23, on and between and movable with the chains 15a, 15a, may engage with the outer end portions of the arms 14a on each supporting member 1', as shown in Figs. 1a and 3, and transfer the latter to the upper run of the conveyor 1b. The transfer or carrying member 23 comprises a connector 23a supported at its opposite ends in alined links of the chains 15a, 15a. By preference the connector 23a consists of a tube enclosing at each end an annular wall 23b provided with a bushing to form a bearing for a shaft 23c, the outer end of which is fixed to the side bar of the adjacent link (see Fig. 7). In this form of construction the tube 23a is free to rotate on the shafts 23c. 24 indicates a pair of bars depending from the tube 23a and terminating at their lower ends in alined hooks 24a opening in opposed relation to the arms 14a on the supporting members 1' as the latter move to the transfer station C. As will be understood from Figs. 3 and 7, when the carrying member is in normal position the depending bars 24 are disposed vertically and extend to a point below the path of movement of the arms 14a, so as to be engaged thereby as each member 1' advances and insure engagement of the hooks 24a with the arms 14a, as later set forth. The upper ends of the bars 24 are preferably provided with collars 24b through which the tube 23a extends. The collars 24b are preferably suitably fixed to the tube 23a to prevent endwise movement thereof to an inoperative position.

The sprockets 20a are spaced from the upper runs of the conveyor 1b a distance approximately equal to the spacing of the sprockets 22 from the upper runs of the chains 1a' so that as the links of the chains 15a, 15a, which support the carrying member 23, reeve around the sprockets 20a the hooks 24a on the bars of the carrying member 23 will move downwardly beyond the upper runs of the conveyor 1b, whereby the arms 14a of the member 1' being transferred to the latter conveyor will engage with the conveyor chains 16a, 16, for travel therewith to the loading and unloading location.

The motor 19a for driving the chains 15a, 15a, is automatically started and stopped. When the chains 15a, 15a, are at rest the carrying member 23 is located at the transfer station C, and when the chains 15a, 15a, are operated by the motor 19a they are moved a distance equal to their length and automatically stopped at the end of the cycle with the carrying member 23 at the transfer station C. As shown in Fig. 1a, the carrying member 23 is at the transfer station C, with the bars 24 extending to a point below the path of movement of the arms 14a, so as to be engaged thereby, as the members 1' advance toward the transfer station C. The chains 15a, 15a, are driven at a rate of speed to move the carrying member 23 from the transfer station C through the complete chain cycle back to the transfer station C in a time period less than that during a predetermined linear travel of the chains 1a', 1a', a preferable distance equal to the spacing between adjoining seats 13 for the arms 14a of the supporting members 1' thereon, so that following the transfer of one member 1' by the carrying member 23 from the conveyor 1a to the conveyor 1b, the carrying member 23 is repositioned and at rest at the transfer station C in the path of movement of the arms 14a of the succeeding supporting member 1'.

As will be observed, the transfer mechanism 1c makes a complete cycle of movement in a period less than the time period required for the alined elements 13 on adjoining alined links to move a distance equal to the spacing therebetween, but as later set forth, the members 1' can be nonuniformly spaced on the chains 1a', 1a', since the operation of the transfer mechanism 1c is dependent on the leading member 1' being advanced by the chains 1a' and not on any predetermined spacing of the members 1'.

As shown in Fig. 1a, the pairs of sprockets 20, 20a, guide the chains 15a, 15a, downwardly in a vertical direction, so that when the alined chain links, to which the carrying member 23 is connected, are guided by these sprockets, the bars 24 move downwardly and the hooks 24a thereon move beyond the plane of movement of the upper runs of the chains 16a, 16a, whereby the arms 14a on the adjacent supporting member 1' are deposited on the latter, whereas the hooks 24a traverse arcuate paths defined by the sprockets 20a. As shown, the chains 15a, 15a, reeve around the sprockets 20 and then reeve around the sprockets 20a, whereas the sprockets 21 are positioned rearwardly of and in a plane above the sprockets 20a. In this arrangement of the sprockets 20a and 21, the hooks 24a on the bars 24 move downwardly beyond the upper runs of the chains 16a, 16a, laterally away from the arms 14a on the adjacent member 1' and upwardly so as to freely disengage the arms 14a thereof.

In operation of the apparatus, the conveyors 1a and 1b are continuously driven, at predetermined rates of speed (preferably at the same speed), whereas the chains 15a, 15a, are normally at rest, the driving motor 19a for these chains being started and stopped by the closing and opening of certain switches in a control circuit 25 (Fig. 8).

As later set forth, the motor 19a is automatically started, to drive the chains 15a, 15a, by the closing of a switch $L_1$ by each of the members 1' as they successively advance to the transfer station C, whereas the motor 19a is automatically stopped, to stop the chains 15a, 15a, by a striker 15x on one of the chain links engaging the arm of a limit switch to operate the latter to open position.

The control circuit 25 consists of the following: 25a, 25a', indicate current supply lines connected to a lead 25b having a normally closed cutout 25b', a push-button switch 25c and a magnetic coil $M'$, which when energized drives the motor 7a to operate the conveyor 1a. 26 indicates a bypass circuit connected to the lead 25b at opposite sides of the switch 25c and having a holding contact $A_1$ and a normally closed limit switch $L_4$. The bypass circuit 26, between the limit switch $L_4$ and lead 25b is connected to a lead 27 having connection with a lead 28 and provided between the connections with the bypass circuit 26 and lead 28 with a holding contact $A_2$. The lead 28 is connected to the supply line 25a' and provided with a magnetic coil $M_3$ (in series in the lead) which when energized drives the motor 16e to operate the conveyor 1b. The lead 28 is provided with a branch lead 28a connected to the supply line 25a' and provided with a normally open switch $L_1$, a normally closed switch $L_3$ and a magnetic coil $M_3$, which is connected in series in the branch lead 28a and when energized starts the motor 19a to operate the transfer mechanism 1c. 29 indicates a bypass circuit connected at one end to the branch lead 28a between the lead 28 and switch $L_1$ and connected at its opposite end to the branch lead 28a between the switch $L_3$ and the magnetic coil $M_3$, and provided with a holding contact $A_3$ and a normally closed switch $L_2$.

Operation: The push-button starting switch 25c is operated to close the circuit through lead 25b to energize the coil $M_1$; coil $M_1$ closes (a) holding contact $A_1$ to maintain the circuit through coil $M_1$ closed and continuously drive motor 7a and (b) contact $A_2$ to complete the circuit through and energize coil $M_2$ to continuously drive the motor 16e. In the above operation, the driving conveyors 1a and 1b are set in operation, but due to the fact that the switch $L_1$ is open and circuit through branch lead 28a is not completed, the transfer mechanism 1c is at rest. With the conveyors 1a and 1b in operation, the supporting members 1' carrying hides x may be positioned on the upper run of conveyor 1a. As the leading supporting member 1' advances to the transfer station C, it engages an arm in the path of movement of the member to close the switch $L_1$, thereby completing the circuit through magnetic coil $M_3$, which being energized starts the motor 19a to operate the chains 15a, 15a, and closes the contact $A_3$ in the bypass circuit 29, to maintain the circuit through the coil $M_3$, after the supporting member 1' has cleared the switch $L_1$ and the latter opens. As shown in dotted lines in Fig. 1a, the hooks 24a are disposed below the path of movement of the arms 14a, so that upon driving of the chains 15a, 15a, the hooks 24a are raised so as to engage and pick up the arms 14a on the adjacent member 1' and convey it to a position above the upper run of the conveyor 1b and then downwardly, whereby the member 1' is deposited on the conveyor 1b and the hooks 24a on the carrying member 23 move downwardly and then upwardly as already set forth, the carrying member 23 being moved by the chains 15a, 15a, to and stopped at its normal position, stoppage of the chains being automatically effected by a striker 15x riding the arm of switch $L_2$ to open the bypass circuit 29, whereby the coil $M_3$ is de-energized the effect of which is to stop the motor 19a.

From the foregoing description it will be observed that upon operation of the push-button switch 25c, the conveyor system is set in operation; that is, the conveyors 1a, 1b, are continuously driven and the transfer mechanism 1c is at rest but operatively connected in the control circuit 25 for automatic operation. If now the supporting members 1' with hides x thereon are loaded on the successive links of the chains 1a', 1a', they will move therewith and successively operate the switch $L_1$ and thus effect driving of the chains 15a, 15a, through one cycle, the movement of the chains being stopped by the automatic operation of normally closed switch $L_2$ to open position, each such movement of the chains serving to transfer a member 1' to and deposit it on the upper runs of the chains 15a, 15a, for movement to the unloading location B. It will also be observed that since the switch $L_1$ is operated to closed position by each of the members 1', they may be positioned on successive alined links or variously selected alined links of the chains 1a' for movement to the transfer station C.

It will further be observed that each starting of the transfer mechanism 1c is effected automatically by the members 1' but that each stopping thereof is effected automatically by one of the chains 15a independently of the succeeding advancing member 1' or the member 1' which is being transferred to or has been deposited on the conveyor 1b.

Provision is made for opening the by-pass circuit 26 in the event the transfer mechanism 1c for any reason fails to operate. Under such conditions, the leading member 1' then being advanced by the chains 1a', 1a', will overrun the switch $L_1$ and operate the limit switch $L_4$ to open position, the effect of which is to de-energize the coil $M_1$, thereby stopping the motor 7a, and open the circuit through leads 27 and 28 to de-energize coil $M_2$, thereby stopping motor 16e.

In the event the conveyor 1b becomes inoperative, provision is made for stopping the transfer of additional members 1' thereto. For this purpose, the switch $L_3$ is so positioned with respect to one of the chains 16a, 16a, that each time a member 1' is deposited on the chains it will engage the arm of the switch and hold it open until the chains, in their movement toward the loading and unloading location B, effect a disengagement of the member from the switch arm, so that the switch can close. If at the time the conveyor 1b becomes inoperative, the transfer mechanism 1c is being operated through the chain cycle, the member 1' then being transferred by the mechanism 1c will be deposited on the chains 16a, 16a, and operate the switch $L_3$. However, as the switch $L_3$ is in the lead 28a between the connections of the by-pass circuit 29 therewith, and the by-pass circuit is closed through the latter circuit, the transfer mechanism 1c will continue to operate to move the carrying member 23 to its normal position and as already set forth, in such movement of the chains 15a, 15a, switch $L_2$ is opened to stop the movement of the chains 15a, 15a, it follows that as the switch $L_3$ has been opened, the circuit through the coil $M_3$ can only be established by operation of switch $L_1$ to closed position. Accordingly, so long as a member 1' remains in the position to keep the switch $L_3$ open, the circuit through the coil $M_3$ cannot be completed. As the switch $L_1$ opens, immediately after each member 1' (as the latter is being removed from the chains 1a', 1a') clears it and the switch $L_3$ is operated by the member when it is seated on the chains 16a, 16a, the latter switch is effective to control the circuit through the coil $M_3$ after the switch $L_2$ is operated by the striker 15x. It is to be noted that where the last described inoperative condition occurs, that is, switch $L_3$ is maintained in open position and prevents starting of the transfer mechanism 1c, the chains 1a', 1a', continue to operate until the succeeding member 1' overruns the switch $L_1$ and opens the switch $L_4$ in the by-pass circuit 26, thereby de-energizing coil $M_1$ to stop the motor 7a as well as open the circuits through coils $M_2$ and $M_3$. The control circuit 25 may be disconnected from the current supply by operation of push-button switch 25b' to open position.

By arranging the conveyors 1a, 1b, in parallel, one above the other and providing a transfer mechanism between them, a minimum area or floor space is required. Also, in this arrangement, the lower conveyor is loaded and the upper conveyor is unloaded at the same location, so that a minimum number of employees is required and length of travel of the hides and/or the supporting members with hides thereon is materially reduced.

Mechanism may be employed at the loading and unloading location B to engage each supporting member 1' as it is advanced by the conveyor 1b thereto, whereby it may be readily lowered to a level to permit the member to be handled and carried or transported on a frame or rack to a place where the hide can be further processed. For this purpose, I have shown a hoist having a frame 30 mounted on a track 31, which is suitably fixed to the ceiling A'. The frame 30 supports a suitable electric motor having a gear reducing mechanism and a switch operated by a pull-cord. The frame includes laterally extending tubes 32 supporting housings 32a at their outer ends. The housings enclose drums for cables 33 the outer ends of which are provided with hooks 34 adapted to engage the arms 14a on each member 1' as the latter approaches the end of its movement on the chains 16a. As shown in Fig. 1b, the cables 33 depend downwardly and are disposed in the path of movement of the arms 14a, whereby the latter can be engaged by the hooks on the cables. As the arms 14a extend outwardly a relatively long distance, the cables 33 can be positioned outwardly of the chains 16a, 16a. The cable drums are driven by shafts extending through the tubes 32, their inner ends being drivingly connected to the shafts of the gear reducing mechanism.

The serrations 16x on the chains 16a, 16a, are engaged by the arms 14a on the members 1' and serve to prevent displacement of the members on the chains, especially where a blower is employed to circulate air in contact with hides being conveyed on the chains 16a, 16a.

It will be observed that the conveyors 1a and 1b may be operated by mechanism that is connected to and driven by a single motor; in this form of construction coil $M_2$ and contact $A_2$ would be omitted, but the operation of the apparatus as described herein, would not be changed.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. An apparatus for treating sections of material comprising, in combination, parallel loading and unloading conveyors, each consisting of a pair of spaced endless chains mounted on pairs of reeving elements, power means for driving said conveyors in opposite directions, a loading and unloading location at corresponding ends of said conveyors, a plurality of members for supporting the sections of materials to be treated arranged to be successively loaded on the chains of said loading conveyor in spaced relation for movement therewith, each said supporting member being provided at its opposite ends with laterally extending arms arranged to engage alined links of the chains to support the adjacent member therebetween, a transfer mechanism between the opposite corresponding ends of said conveyors and including a member for picking up and carrying one of said supporting members during each operation of said mechanism from said loading conveyor to and depositing it on the chains of said unloading conveyor and a motor for operating said transfer mechanism, said mechanism being at rest during movement of the leading supporting member being advanced by said loading conveyor toward said carrying member with said carrying member in position to pick up the leading supporting member, and electrically operated means for starting and stopping said motor, said last mentioned means including a circuit connected with a source of electric current supply, a switch disposed in the path of movement of said supporting members and operated successively by the movement of the latter as said members move toward said carrying member to close said circuit and start said motor to operate said transfer mechanism, and a separate switch for opening said circuit to stop said mechanism with said carrying member at its starting position.

2. An apparatus as claimed in claim 1 wherein said power means consist of an electrically driven mechanism controlled by said circuit and a safety switch spaced beyond said first mentioned switch in the path of movement of said supporting members and operated by the leading member in the event of an overrun to stop said motor and said electrically driven mechanism.

3. An apparatus for treating sections of material comprising, in combination, parallel loading and unloading conveyors, each consisting of a pair of spaced endless chains mounted on pairs of reeving elements, power means for driving said conveyors in opposite directions, a loading and unloading location at corresponding ends of said conveyors, a plurality of members for supporting the sections of material to be treated arranged to be successively loaded on the chains of said loading conveyor in spaced relation for movement therewith, each said supporting member being provided at its opposite ends with laterally extending arms arranged to engage alined links of the chains to support the adjacent member therebetween, a transfer mechanism between the opposite corresponding ends of said conveyors and including a member for carrying one of said supporting members during each operation of said mechanism from said loading conveyor to and depositing it at a predetermined position on the chains of said unloading conveyor, and a motor for operating said transfer mechanism, said mechanism being at rest during movement of the leading supporting member being advanced by said loading conveyor toward said carrying member, and electrical means for controlling the operation of said power means and said motor consisting of circuits connected with a source of current supply, normally open and normally closed switches in one of said circuits, said normally open switch being operated to closed position by each advancing supporting member to close the circuit to said motor to operate said transfer mechanism and said normally closed switch being operated by said transfer mechanism in each cycle of operation thereof to open the circuit to stop said motor, and a separate normally closed switch connected in the circuit controlled by said normally open switch and disposed in position to be engaged and operated to open position as each supporting member is deposited on the chains of said unloading conveyor, to prevent closing of the circuit by said normally open switch until said supporting member, due to movement of said unloading conveyor chains, has disengaged said separate switch.

4. An apparatus for treating sections of material comprising, in combination, parallel loading and unloading conveyors, consisting of pairs of spaced endless chains each mounted on pairs of reeving elements, power means for driving said conveyors in opposite directions, a loading and unloading location at corresponding ends of said conveyors, a plurality of members for supporting the sections of material to be treated arranged to be successively loaded on the chains of said loading conveyor in spaced relation for movement therewith, each said supporting member being provided at its opposite ends with laterally extending arms arranged to engage alined links of the chains to support the adjacent member therebetween, a transfer mechanism between the opposite corresponding ends of said conveyors and including a member for carrying one of said supporting members during each opertaion of said mechanism from said loading conveyor to and depositing it on the chains of said unloading conveyor and a motor for operating said transfer mechanism, said mechanism being at rest during movement of the leading supporting member being advanced by said loading conveyor toward said carrying member, and electric means for controlling the operation of said power means and said motor consisting of a circuit having connection with a source of current supply, switches in said circuit for closing said circuit to said power means, a lead connected at one end through said circuit to one current supply line and at its opposite end to the other current supply line, a normally open switch, a normally closed switch and a magnetically operated device in said lead, a by-pass circuit connected to said lead outwardly of said normally open switch and between said normally closed switch and said magnetically operated device and having a holding contact and a separate normally closed switch therein, said normally open switch in said by-pass circuit being closed by each supporting member as it moves into transfer position to close the circuit through said magnetically operated device to operate the transfer mechanism operating motor and close said holding contact and said normally closed switch in said by-pass circuit being opened by said transfer mechanism to stop it at its position of rest, said normally closed switch in said lead being disposed adjacent that position at which each supporting member is deposited on the chains of the unloading conveyor and operated by said member to open position until said member disengages the said switch, due to movement of said conveyor, said normally closed switch being maintained in open position so long as it is engaged by a supporting member to prevent closing of the circuit through said magnetically operated device.

5. A conveyor system for treating sections of material having, in combination, two conveyors, power operated mechanism for operating said conveyors in opposite directions, a plurality of members for supporting the material to be treated removably engaging one of said conveyors for movement to its discharge end, a transfer mechanism disposed adjacent the discharge end of said last mentioned conveyor and the receiving end of the other conveyor and normally at rest and provided with a carrier for successively transferring the supplied members to the other conveyor while moving through a cycle, a control circuit including a normally open switch operated by each member to closed position to operate said transfer mechanism and move said carrier through a complete cycle and a normally closed switch in said circuit operated by said transfer mechanism to stop it at the end of the cycle of said carrier, and a separate normally closed switch in said circuit in the path of movement of said members and operated to open position by an advancing member in the event said transfer mechanism fails to remove the advancing member from the adjacent conveyor to stop said power operated mechanism.

6. An apparatus as claimed in claim 5 wherein is provided a normally closed limit switch in said circuit at the receiving end of said other conveyor operated by each member to open position as it is deposited thereon to make said normally open switch inoperative.

7. An apparatus for treating material comprising, in combination, lower and upper conveyors, each consisting of spaced endless chains and pairs of reeving elements therefor, power means for driving said conveyors in opposite directions, a plurality of members each adapted to support the material to be treated and arranged to be successively loaded on the chains at one end of said lower conveyor in spaced relation for movement therewith, each said supporting member being provided at its opposite ends with outwardly extending arms arranged to engage alined links of the chains to support the adjacent member therebetween, a transfer mechanism between the opposite ends of said lower conveyor and the adjacent end of said upper conveyor and including a member for carrying one of said supporting members during each operation of said transfer mechanism from said lower conveyor to and depositing it on the chains of said upper conveyor and a motor for operating said mechanism, said mechanism being at rest during movement of the leading supporting member being advanced by said lower conveyor toward said carrying member, and means for automatically controlling the starting and stopping of said motor in co-ordinated relation to the successively advancing supporting members, said carrying member consisting of depending swingable bars disposed in the path of movement of the arms on said supporting members and operated outwardly to an inclined position in advance of the starting of said transfer mechanism by the arms of each supporting member during movement thereof by said loading conveyor, said bars being provided with elements arranged to automatically removably engage the arms of the advancing supporting member upon operation of said transfer mechanism.

8. An apparatus for treating materials, comprising two parallel conveyors adapted to be driven in opposite directions, a plurality of supporting members removably supporting the materials to be treated and each provided at its opposite ends with laterally extending arms to engage and be supported on and carried by one of said conveyors, means for driving said conveyors, and a transfer mechanism adjacent to the discharge end of said member-carrying conveyor and the receiving end of the other conveyor, said transfer mechanism being normally at rest, driving means for said mechanism, said transfer mechanism including a pair of swingable bars provided with elements arranged to engage said arms on each of said supporting members, said bars being disposed in the path of movement of said arms on each supporting member, and swung outwardly thereby in advance of starting said transfer mechanism, and means operable in co-ordinated relation to the movement of said bars for starting said transfer mechanism.

ARTHUR D. SABORSKY.

REFERENCES CITED

The following references are of record in the file of this patent:

UNITED STATES PATENTS

| Number | Name | Date |
|---|---|---|
| 277,033 | Hilbers | May 8, 1883 |
| 1,250,478 | McKenzie | Dec. 18, 1917 |
| 1,830,359 | Hamel | Nov. 3, 1931 |